April 30, 1946.  W. H. SNOW  2,399,580
STEERING WHEEL ATTACHMENT
Filed Sept. 28, 1944
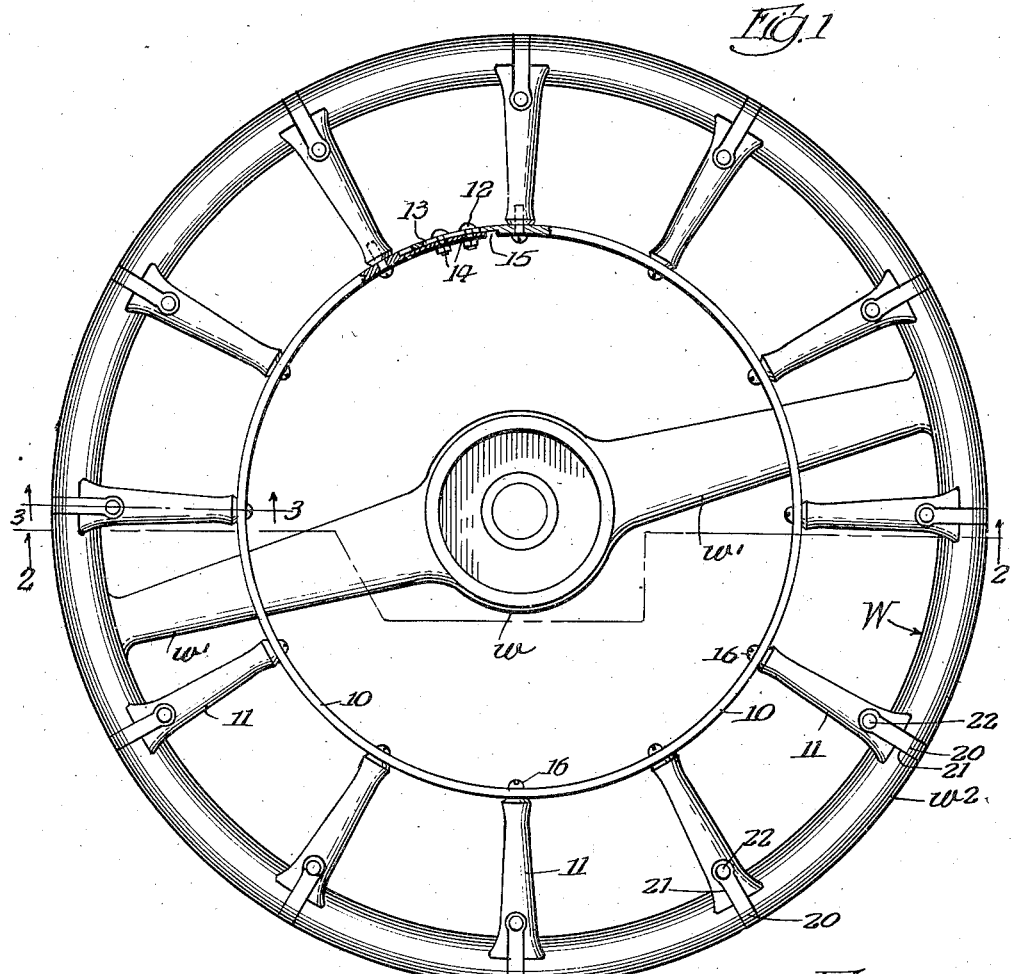
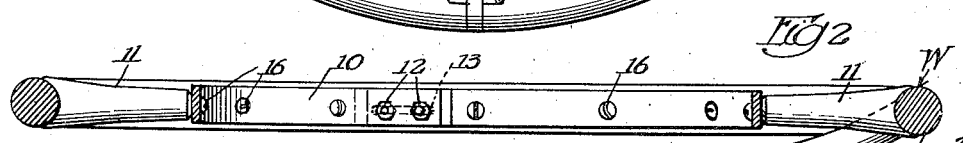
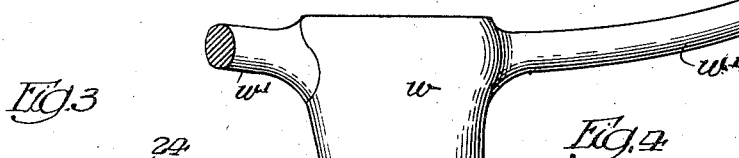
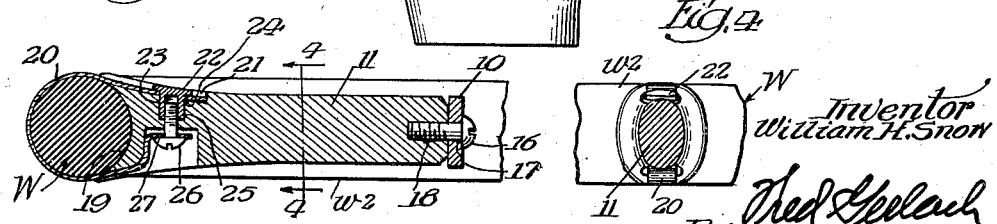
Inventor
William H. Snow Patented Apr. 30, 1946

2,399,580

UNITED STATES PATENT OFFICE 2,399,580

STEERING WHEEL ATTACHMENT

William H. Snow, Chicago, Ill.

Application September 28, 1944, Serial No. 556,147

3 Claims. (Cl. 74—557)

The present invention relates generally to steering wheel attachments. More particularly the invention relates to that type of attachment which is primarily designed for application to an automobile steering wheel and serves when in its operative or attached position to facilitate one hand gripping of the wheel in connection with spinning or turning of the latter.

One object of the invention is to provide an automobile steering wheel attachment of this type which is an improvement upon, and has certain advantages over, previously designed attachments of the same general character and for the same purpose and is characterized by high efficiency, simplicity of design or construction and facility of attachment.

Another object of the invention is to provide a steering wheel attachment of the type and character under consideration which comprises a ring which is of substantially less diameter than, and positioned concentrically within, the rim of the steering wheel, and in addition an annular series of spaced apart radially extending spokes, the inner ends of which are connected fixedly to the ring and the outer ends of which are provided with releasable means for attachment to the steering wheel rim.

A further object of the invention is to provide an attachment of the last mentioned type and character which is adjustable in order that it may be applied to automobile steering wheels, the rims of which vary in diameter.

A still further object of the invention is to provide an automobile steering wheel attachment which is generally of new and improved construction, may be manufactured or produced at a low cost and is characterized by the fact that it offers no hindrance or obstruction to the normal manipulation of the steering wheel with which it is employed.

Other objects of the invention and the various advantages and characteristics of the present steering wheel attachment will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like letters and numerals of reference denote corresponding parts throughout the several views:

Figure 1 is a plan view of an automobile steering wheel having applied thereto an attachment embodying the invention;

Figure 2 is a vertical transverse section on the line 2—2 of Figure 1;

Figure 3 is an enlarged vertical transverse section taken on the line 3—3 of Figure 1 and illustrating the manner in which the inner ends of the spokes of the attachment are attached to the ring and the construction and design of the releasable means for connecting the outer ends of the spokes to the steering wheel rim; and Figure 4 is a section on the line 4—4 of Figure 3.

The attachment which is shown in the drawing constitutes the preferred form or embodiment of the invention. It is illustrated in connection with an automobile steering wheel W and serves, as hereinafter described, to assist the operator or driver of the automobile in spinning or readily rotating the steering wheel with one hand. The steering wheel W is of conventional or standard design and comprises a hub $w$, a pair of spokes $w^1$, and a circular rim $w^2$. The hub is provided with means (not shown) for attachment to the steering wheel post of the automobile with which the wheel W is associated. The spokes $w^1$ are positioned diametrically opposite one another and are connected to, and radiate from, the hub. The rim $w^2$ is adapted to be gripped by the hands in connection with normal steering of the automobile and surrounds, and is secured to, the outer ends of the spokes $w^1$. As shown in Figure 2 the spokes $w^1$ extend upwards to a slight extent in order that the rim $w^2$ is disposed above the upper end of the hub.

The attachment is essentially in the form of an accessory and as its principal or primary components comprises a ring 10 and an annular series of equidistantly spaced radially extending spokes 11.

The ring 10 is preferably formed of strong metal, such as steel, although, if desired, it may be formed of so-called "plastic" type material. It is rectangular in cross section, and, as shown in Figure 1, is of materially less diameter than, and positioned concentrically within, the circular steering wheel rim $w^1$. Preferably the ring 10 is formed of a single strip which is bent for ring forming purposes and has its ends in lapped relation and adjustably connected together by a pair of bolts 12. The shanks of these bolts extend through a longitudinally elongated slot 13 in one end of the ring forming strip and through holes 14 in the other end of the strip. When the bolts are loosened the ring may be adjusted so as to increase or decrease its diameter. By having the ring adjustable so far as diameter is concerned the attachment as a whole is capable of being applied to steering wheels, the rims of which vary in diameter. With a view of having the ring 10 of uniform thickness throughout its entire circumference the ends of the ring forming strip are provided with longitudinally extending complemental side notches 15, as shown in Figure 1.

The spokes 11 extend between the ring 10 of the attachment and the steering wheel rim $w^2$ and are preferably formed of molded "plastic" type material, although, if desired, they may be formed of any other suitable material. The inner ends of the spokes 11 are flat. They fit flatly against the outer periphery of the ring 10 and are fixedly secured to the ring by means of screws 16. As best shown in Figure 3, the screws 16 are arranged so that the heads thereof fit against the inner periphery of the ring and their shanks extend through holes 17 in the ring and into screw threaded sockets 18 in the inner ends of the spokes 11. The outer ends of the spokes 11 have concave seats 19 in which the adjacent inner peripheral portions of the steering wheel rim $w^2$ fit snugly, and embody C-shaped sheet metal bands 20. Such bands constitute releasable means for connecting or attaching the outer ends of the spokes to the steering wheel rim and are shaped to surround the rim as shown in Figure 3. The upper ends of the bands 20 fit within recesses 21 in the top portions of the outer ends of the spokes 11 and are anchored in place by head equipped studs 22. Such studs have tubular internally threaded shanks 23 which extend downwards through circular holes 24 in the upper ends of the bands 20 and into the upper ends of vertically extending holes 25 in the outer ends of the attachment spokes 11. As shown in Figure 3, the lower ends of the holes 25 are enlarged. The lower ends of the bands 20 extend into the enlarged lower ends of the holes 25 and have holes 26. They are releasably secured in place by means of clamp screws 27, the shanks of which extend upwards through the holes 26 and into the tubular internally threaded shanks 23 of the studs 22. When the clamp screws 27 are turned or tightened to their fullest extent they serve to contract the bands 20 around the steering wheel rim $w^2$ and thus fixedly connect the outer ends of the spokes 11 to the rim.

In applying the attachment the bolts 12 are first loosened and the screws 27 are removed. Thereafter the ring 10 with the spokes 11 thereon is positioned concentrically within the steering wheel rim $w^2$ and the spokes are manipulated so as to bring the concave seats at the outer ends thereof into interfitting relation with the adjacent inner peripheral portions of the rim. In connection with manipulation of the spokes the ring 10 may, if necessary, be contracted. After the spokes are manipulated into place the C-shaped bands 20 are positioned around the steering wheel rim and then manipulated so as to bring the upper ends thereof into the recesses 21. Thereafter the head equipped studs 22 are inserted into place by inserting the tubular shanks 23 thereof through the holes 24 in the inner ends of the bands and into the upper ends of the vertically extending holes 25 in the outer ends of the attachment spokes 11. After proper positioning of the studs 22 the clamp screws 27 are manipulated into place by inserting the shanks thereof through the holes 26 in the lower ends of the bands 20 and into the internally threaded tubular shanks 23 of the studs 22. After the aforementioned operations the bolts 12 and the screws 27 are tightened so as to effect rigid connection of the attachment to the steering wheel W.

When the attachment is to be used for steering or turning the steering wheel, the driver inserts his or her finger into any one of the spaces between the attachment spokes 11 and then hooks them around the nearest attachment spoke. When the fingers are hooked in place the steering wheel may be quickly or readily spun by swinging the hand in a circular course.

The herein described attachment effectively and efficiently fulfills its intended purpose and is characterized by the fact that it does not hinder the user in connection with normal manipulation of the steering wheel with which it is associated inasmuch as the ring 10 and spokes 11 all are disposed in the same plane as the steering wheel rim $w^2$. Due to the design and construction the attachment may be manufactured or produced at a low cost and it is not likely to catch in the driver's sleeves or become loose. By reason of the fact that the ring 10 is capable of being adjusted so far as its diameter is concerned the attachment may be applied to steering wheels, the rims of which vary in diameter. In view of the fact that the spokes of the attachment embody the C-shaped bands 20 the attachment may be applied with facility.

The invention is not to be understood as restricted to the details set forth since these may be modified within the scope of the appended claims without departing from the spirit and scope of the invention.

Having thus described the invention what I claim as new and desire to secure by Letters Patent is:

1. An attachment designed for use in turning a vehicle steering wheel of the hub, spoke and rim type, and comprising a strip-formed ring adapted to be positioned concentrically within the steering wheel rim and having the ends thereof adjustably connected together in order that the ring may be adjusted as to diameter, and an annular series of spokes having the inner ends thereof connected to the ring and their outer ends provided with means for attachment to said steering wheel rim.

2. An attachment designed for use in turning a vehicle steering wheel of the hub, spoke and rim type, and comprising a strip-formed ring adapted to be positioned concentrically within, and in the same plane as, the steering wheel rim and having its ends adjustably connected together in order that its diameter may be varied, and an annular series of equidistantly spaced radially extending spokes having the inner ends thereof connected fixedly to the ring and their outer ends provided with releasable means for attachment to said steering wheel rim.

3. An attachment designed for use in turning a vehicle steering wheel of the hub, spoke and rim type, and comprising a strip-formed ring adapted to be positioned concentrically within the steering wheel rim and having its ends adjustably connected together so that its diameter may be varied, and an annular series of equidistantly spaced radially extending spokes extending around the ring and having the inner ends fixedly connected to the ring, and means adapted releasably to connect the outer ends of the spokes to said steering wheel rim and embodying C-shaped bands associated, respectively, with the attachment spokes, extending around the rim and having certain ends thereof connected to said outer ends of the attachment spokes by clamp screws.

WILLIAM H. SNOW.